(12) United States Patent
Inoue et al.

(10) Patent No.: US 12,140,219 B2
(45) Date of Patent: Nov. 12, 2024

(54) WATERPROOF STRUCTURE FOR SPEED REDUCER AND ROTATION DEVICE

(71) Applicant: Nabtesco Corporation, Tokyo (JP)

(72) Inventors: Shinji Inoue, Tokyo (JP); Ayaka Watanabe, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 10 days.

(21) Appl. No.: 18/174,741

(22) Filed: Feb. 27, 2023

(65) Prior Publication Data
US 2023/0287972 A1   Sep. 14, 2023

(30) Foreign Application Priority Data
Mar. 14, 2022 (JP) ................. 2022-039593

(51) Int. Cl.
*F16H 57/031* (2012.01)
*B25J 19/00* (2006.01)
*B25J 9/10* (2006.01)
*F16H 57/02* (2012.01)

(52) U.S. Cl.
CPC ........ *F16H 57/031* (2013.01); *B25J 19/0075* (2013.01); *B25J 9/102* (2013.01); *F16H 2057/02034* (2013.01); *F16H 2057/02073* (2013.01)

(58) Field of Classification Search
CPC ......... F16H 57/031; F16H 2057/02034; F16H 2057/02073
See application file for complete search history.

(56) References Cited

U.S. PATENT DOCUMENTS

| 6,877,750 | B2 * | 4/2005 | Engel | B01F 35/00 366/331 |
| 10,011,026 | B2 * | 7/2018 | Okada | B25J 17/00 |
| 2005/0132841 | A1 | 6/2005 | Muller | |
| 2014/0238159 | A1 | 8/2014 | Dimarco et al. | |
| 2017/0217025 | A1 * | 8/2017 | Okada | B25J 17/00 |

(Continued)

FOREIGN PATENT DOCUMENTS

| CN | 201690307 U | 12/2010 |
| CN | 212170474 U | 12/2020 |
| EP | 3913260 A1 | 11/2021 |

(Continued)

OTHER PUBLICATIONS

Notice of Reasons for Rejection dated May 23, 2023, issued in corresponding Japanese Patent Application No. 2022-039593 with English translation (7 pgs.).

(Continued)

*Primary Examiner* — Thomas C Diaz
(74) *Attorney, Agent, or Firm* — Pillsbury Winthrop Shaw Pittman LLP (57) ABSTRACT

A waterproof structure for a speed reducer according to one aspect of the disclosure includes: a speed reducer for decelerating a rotational driving force of an electric motor and transmitting the decelerated rotational driving force to a rotationally driven portion; a motor flange housing the speed reducer; a cover externally covering the speed reducer in a liquid-tight manner; and a holding plate and a first fixing bolt provided on an inner peripheral side of the cover to fix the cover to the motor flange.

12 Claims, 3 Drawing Sheets

(56) References Cited

U.S. PATENT DOCUMENTS

2019/0157936 A1    5/2019  Seshita et al.

FOREIGN PATENT DOCUMENTS

| JP | 2015-055318 A | 3/2015 |
| JP | 2015-113889 A | 6/2015 |
| JP | 2016-510860 A | 4/2016 |
| WO | 2013/023206 A1 | 2/2013 |
| WO | 2019/049297 A1 | 3/2019 |

OTHER PUBLICATIONS

Notice of Reasons for Rejection dated Oct. 24, 2023, issued in corresponding Japanese Patent Application No. 2022-039593 with English translation (8 pgs.).

Extended European Search Report dated Aug. 16, 2023, issued in corresponding European Patent Application No. 23158211.5 (12 pgs.).

* cited by examiner

WATERPROOF STRUCTURE FOR SPEED REDUCER AND ROTATION DEVICE

CROSS-REFERENCE TO RELATED APPLICATIONS

This application is based on and claims the benefit of priority from Japanese Patent Application Serial No. 2022-039593 (filed on Mar. 14, 2022), the contents of which are hereby incorporated by reference in their entirety.

TECHNICAL FIELD

The present disclosure relates to waterproof structure for a speed reducer and a rotation device.

BACKGROUND

Industrial robots and machine tools, such as those having a pair of arms rotatably coupled to each other, include a motor unit provided at a coupling portion (joint) between the arms so as to drive the arms. The motor unit includes a motor and a speed reducer coupled to the motor. A motor torque generated as the motor rotates is decelerated by the speed reducer and output to the arms.

Such industrial robots may be placed in an environment exposed to water when installed or used outdoors. In such cases, water penetration into the speed reducer accelerates corrosion inside the speed reducer. Therefore, water is prevented from penetrating into the speed reducer. For example, a waterproof cover may be installed on the outside of the speed reducer (see, for example, Japanese Patent Application Publication No. 2015-055318).

However, a conventional waterproof cover is fixed to the speed reducer positioned inside of it with, for example, a fixing bolt tightened from the outside of the cover. In this way, when the cover is fixed from the outside, a fastener such as a fixing bolt is needed that penetrates the cover in the thickness direction. The cover thus has a through hole formed therein. Therefore, water may penetrate through the through hole into the inside of the cover, making it difficult to accomplish complete waterproofness. Therefore, quality issues remained and there was room for improvement.

SUMMARY

The present disclosure provides waterproof structure for a speed reducer and a rotation device capable of improving the waterproof performance.

(1) A waterproof structure for a speed reducer according to one aspect of the disclosure comprises: a speed reducer for decelerating a rotational driving force of an electric motor and transmitting the decelerated rotational driving force to a rotationally driven portion; a case housing the speed reducer; a cover externally covering the speed reducer in a liquid-tight manner; and a fixing unit provided on an inner peripheral side of the cover to fix the cover to the case.

With this configuration, the cover can be fixed by the fixing unit from the inner peripheral side of the cover to the case housing the speed reducer. In other words, the waterproof structure of this aspect has no fixing unit on the outer peripheral side of the cover, and thus is not configured such that a fixing unit such as a fixing bolt extends through the cover to fix the cover to the case. Therefore, there is no need to provide a through hole extending through the cover, and it is possible to prevent water from entering to the speed reducer side through the through hole. Accordingly, the waterproof structure can have an improved waterproof performance. This configuration allows the cover to be integrated with the speed reducer inside without being penetrated by bolts or the like, thereby establishing waterproof quality through internal fixing.

(2) In the waterproof structure for a speed reducer according to (1), the fixing unit may be provided on at least one of the cover or the case.

(3) In the waterproof structure for a speed reducer according to (1) or (2), the fixing unit may fix the cover to the case in an axial direction of the electric motor.

(4) In the waterproof structure for a speed reducer according to any one of (1) to (3), the fixing unit includes: a protruding portion protruding radially inward from an inner peripheral surface of the cover; and a holding member clamping the protruding portion together with the case in an axial direction of the electric motor.

(5) In the waterproof structure for a speed reducer according to (4), the fixing unit may include a fastening member inserted through the holding member and tightened into the case. The holding member is configured to clamp the protruding portion together with the case as the fastening member is tightened in the axial direction.

(6) In the waterproof structure for a speed reducer according to (5), the speed reducer may have a flange portion protruding radially outward from an outer peripheral surface of the speed reducer. The flange portion is located between the case and the holding member in the axial direction. The flange portion has a through hole extending in the axial direction. The fastening member is inserted through the through hole of the flange portion interposed between the holding member and the case and is tightened into the case.

(7) In the waterproof structure for a speed reducer according to any one of (4) to (6), the holding member may be integrally fixed to an outer peripheral surface of the case.

(8) In the waterproof structure for a speed reducer according to any one of (4) to (6), the holding member may be integrally fixed to an outer peripheral surface of the speed reducer.

(9) In the waterproof structure for a speed reducer according to any one of (4) to (8), the holding member may be an annular plate extending over an entire circumference around a motor shaft of the electric motor.

(10) In the waterproof structure for a speed reducer according to any one of (1) to (3), the fixing unit may include: a protruding portion protruding radially inward from an inner peripheral surface of the cover and having a through hole extending through the protruding portion in an axial direction of the electric motor; and a fastening member inserted through the through hole and tightened into the case.

(11) In the waterproof structure for a speed reducer according to any one of (1) to (10), water stop members may be provided on both sides of the cover in an axial direction, and the water stop members are configured to stop water between the cover and an outer peripheral surface of the case.

(12) A waterproof structure for a speed reducer according to another aspect of the disclosure comprises: a speed reducer for decelerating a rotational driving force of an electric motor and transmitting the decelerated rotational driving force to a rotationally driven portion; a case housing the speed reducer; a cover externally covering the speed reducer in a liquid-tight manner; and a fixing unit provided on an inner peripheral side of the cover to fix the cover to the case. The fixing unit includes: a protruding portion protruding radially inward from an inner peripheral surface of the cover; a holding member clamping the protruding portion together with the case in an axial direction of the electric motor; and a fastening member inserted through the holding member and tightened into the case. The holding member is an annular plate extending over an entire circumference around a motor shaft of the electric motor, and the holding member is configured to clamp the protruding portion of the cover together with the case as the fastening member is tightened in the axial direction. Water stop members are provided on both sides of the cover in the axial direction, and the water stop members are configured to stop water between the cover and an outer peripheral surface of the case.

This configuration simplifies the fixing unit. The waterproof structure can be easily assembled by, for example, providing the fixing unit beforehand on at least one of the cover or the case. In the waterproof structure for a speed reducer according to this aspect, the holding member can be used to fix the cover to the case so as to prevent the cover from moving in the axial direction. In the waterproof structure for a speed reducer according to this aspect, the holding member is fixed as the fastening member is tightened. The fixed holding member can clamp the protruding portion together with the case, and thus the cover can be fixed to the case so as to prevent the protruding portion from moving in the axial direction. In this aspect, the cover can be easily fixed to the case only by tightening the fastening member, improving the work efficiency in assembling the waterproof structure. In the waterproof structure for a speed reducer according to this aspect, for example, the cover, the speed reducer, and the case can be fixed simultaneously by inserting the fastening member through a through hole in the speed reducer and tightening the fastening member into the case. Therefore, the time and labor required for assembling the waterproof structure can be reduced, resulting in an improved work efficiency. In the waterproof structure for a speed reducer according to this aspect, one holding member can hold the cover against the case with a balanced and uniform force over the entire circumference. Therefore, it is possible to prevent the cover from being displaced in the axial direction and prevent the water-stopping performance from being degraded. In the waterproof structure for a speed reducer according to this aspect, it is possible to ensure the water-stopping performance between the cover and the case at positions on the cover on both sides of the fixing unit in the axial direction.

(13) A rotation device according to one aspect of the disclosure comprises: a device body; a rotating body having a working head; an electric motor provided in the device body, the electric motor being configured to produce a driving force to rotate the rotating body; a speed reducer for decelerating a rotational driving force of the electric motor and transmitting the decelerated rotational driving force to a rotationally driven portion; a case housing the speed reducer; a cover externally covering the speed reducer in a liquid-tight manner; and a fixing unit provided on an inner peripheral side of the cover to fix the cover to the case.

With this configuration, the waterproof structure for the speed reducer can be installed on the rotation device having the rotating body configured to be rotated by the rotational driving force transmitted from the electric motor and the speed reducer.

The waterproof structure for the speed reducer and the rotation device described above can improve the waterproof performance.

DESCRIPTION OF THE EMBODIMENTS

The embodiments of the present invention will be hereinafter described with reference to the drawings. In the following embodiments and modifications, like elements will be denoted by the same reference signs and redundant descriptions will be partly omitted.

Figure 1:
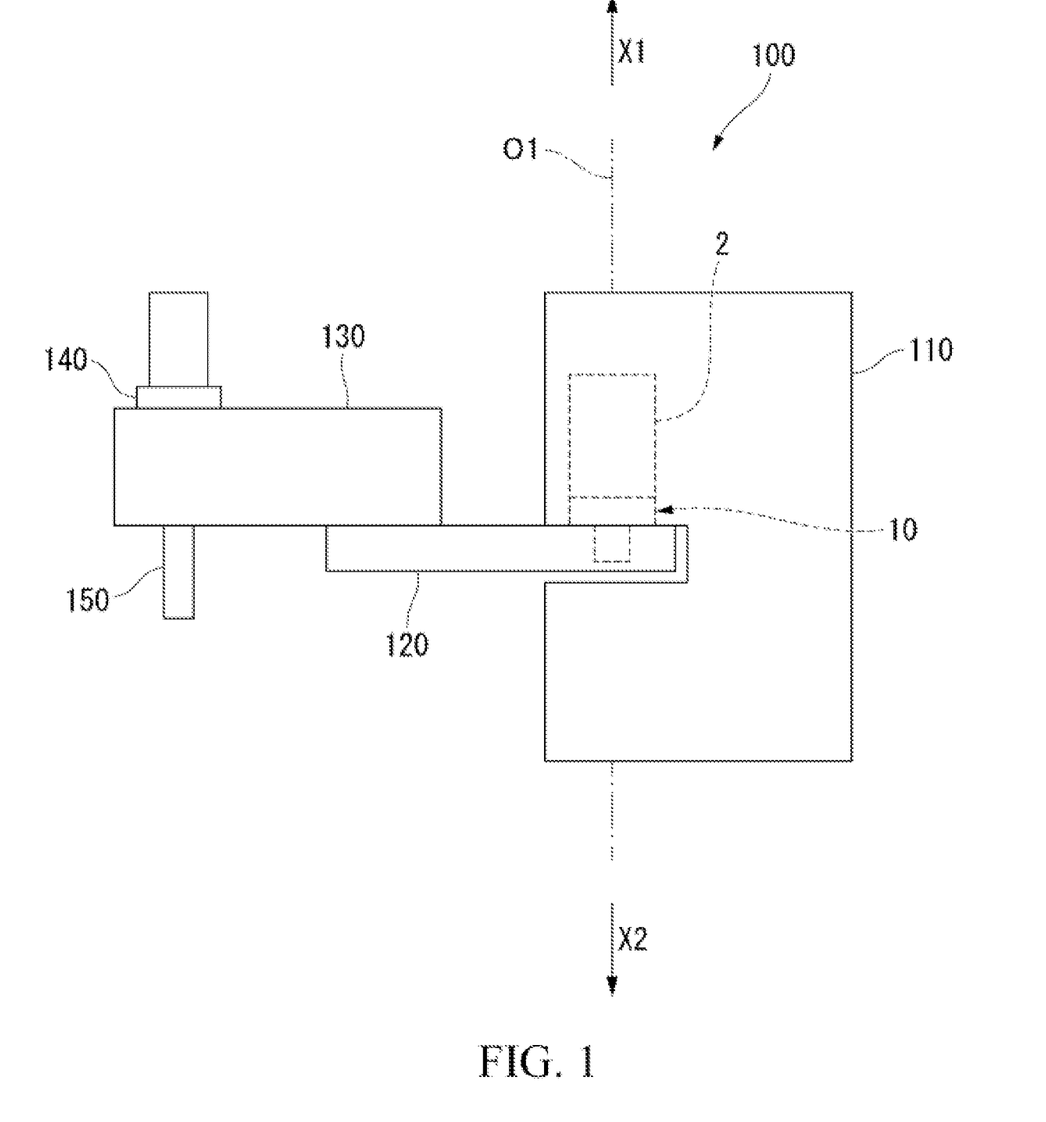
FIG. 1 is a side view showing an industrial robot including a speed reducer according to an embodiment.

FIG. 1 is a side view showing an industrial robot 100 including a speed reducer 10 in a driving unit, and the speed reducer 10 is configured to be installed on a motor with a speed reducer. The industrial robot 100 (rotation device) according to the present embodiment is an industrial robot used, for example, for feeding, shipping, transporting, and assembling parts of precision equipment and the like. The industrial robot 100 has a pedestal 110 (device body), a first arm 120 (rotating body), a second arm 130 (rotating body), a working head 140, and an end-effector 150.

Figure 2:
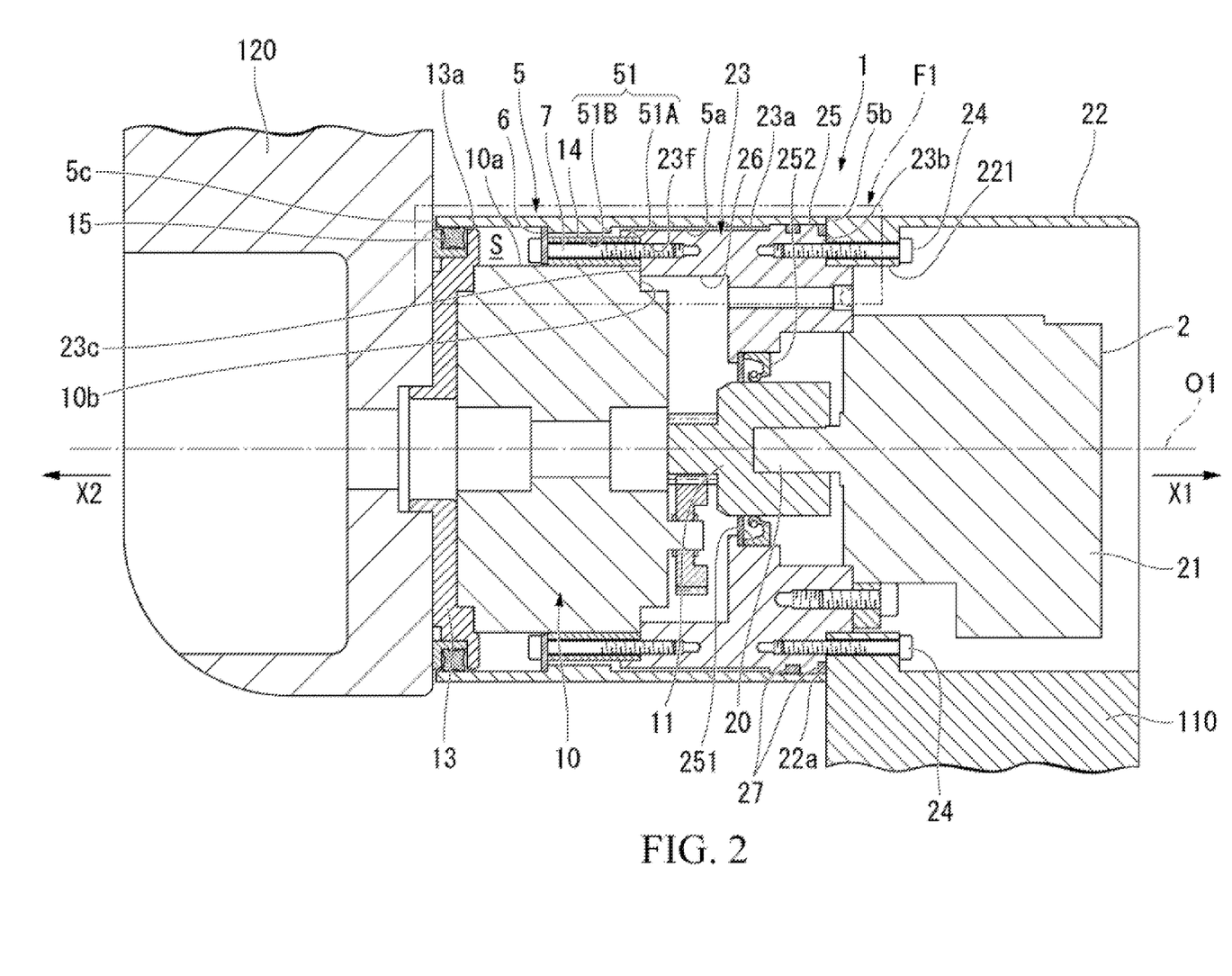
FIG. 2 is a sectional view of the speed reducer including an electric motor according to an embodiment.

The first arm 120, which is rotatable around an axis O1, is coupled with the pedestal 110. The second arm 130, which is rotatable around an axis parallel to the axis O1, is coupled with the first arm 120. The working head 140 is provided at the distal end of the second arm 130 and coupled with the end-effector 150. The pedestal 110 contains an electric motor 2 such as a servomotor, and the speed reducer 10 for reducing the speed of the rotations of the electric motor 2. The first arm 120 can be rotated by the driving force from the motor 2. As shown in FIG. 2, an input shaft 11 (described later) of the speed reducer 10 is coupled with the rotating shaft (a motor shaft 20) of the electric motor 2. An output-side case 13 of the speed reducer 10 is coupled with the first arm 120. When the driving force from the electric motor 2 is transmitted to the first arm 120 through the speed reducer 10, the first arm 120 rotates within a horizontal plane around the axis O1.

As shown in FIG. 1, the speed reducer 10 is provided in the above-described industrial robot 100 at a coupling portion (joint) of the first arm 120 rotatably coupled to the pedestal 110. The speed reducer 10 decelerates at a predetermined reduction ratio a motor torque inputted thereto from the electric motor 2 serving as a drive source and outputs the decelerated torque to the output-side case 13. In other words, the speed reducer 10 is configured to change the number of rotations at a predetermined ratio and transmit a resulting driving force between the drive source and a movable part such as an arm.

In the following description of the embodiments, the direction along the axis O1 of the electric motor 2 of the speed reducer 10 is hereunder simply referred to as the axial direction, and a direction orthogonal to the axis O1 as viewed in the axial direction is referred to as a radial direction, and a circumferential direction about the axis O1 is simply referred to as a circumferential direction. Furthermore, with respect to the axial direction, the term "the axially inner side" may refer to the inwardly facing side of an object, and the term "the axially outer side" may refer to the opposite side of the object. With respect to the axial direction, the term "input side X1" refers to the side of the speed reducer 10 connected to the drive source, and the term "output side X2" refers to the side of the speed reducer 1 connected to the mechanical part such as an arm receiving the output from the speed reducer 10.

As shown in FIG. 2, the speed reducer 10 includes a reduction unit (not shown) having planetary gears or the like between the motor shaft 20 of the electric motor 2 and the first arm 120. In the following description, portions of the speed reducer 10 are referred to as follows. With respect to the direction of the axis O1 (the axial direction) extending through the central axis of the motor shaft 20, the side on the electric motor 2 is the input side X1 (the right side in the drawing), and the side opposite thereto is the output side X2 (the left side in the drawing). As viewed from the direction of the axis O1, a direction toward the outer peripheral side of the speed reducer 10 in a radial direction orthogonal to the axis O1 is referred to as a radially outward direction, and a direction toward the axis O1 in a radial direction orthogonal to the axis O1 is referred to as a radially inward direction.

Figure 3:
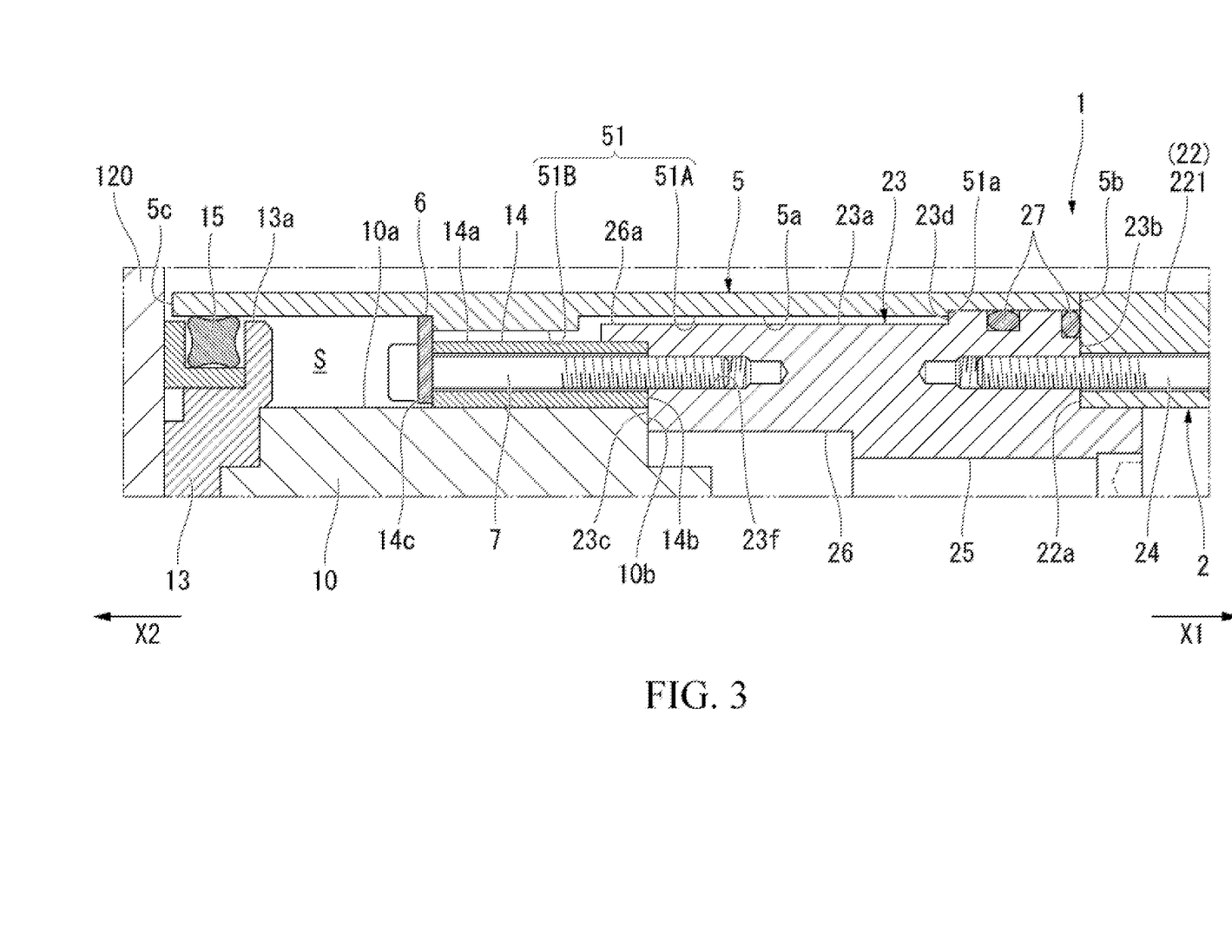
FIG. 3 is an enlarged view of a main part of the speed reducer shown in FIG. 2.

Next, the waterproof structure 1 for the speed reducer 10 according to the present embodiment will be described in detail with reference to FIGS. 2 and 3. FIG. 2 is a sectional view of a driving unit including the electric motor 2 and the speed reducer 10. FIG. 3 is an enlarged view of the region F1 of FIG. 2. In the waterproof structure 1, the entirety of the speed reducer 10 is covered in a liquid-tight manner to improve waterproof performance.

As shown in FIG. 2, the waterproof structure 1 includes: the speed reducer 10 configured to decelerate the rotational driving force from the electric motor 2 and transmits the decelerated rotational driving force to a rotationally driven portion (such as the first arm 120 shown in FIG. 1); a case (a motor flange 23 described later) that houses the motor shaft 20 of the electric motor 2 and the speed reducer 10; and a cover 5 that externally covers the speed reducer 10 in a liquid-tight manner.

The electric motor 2 includes the motor shaft 20, a motor body 21, a motor case 22 (a case) retaining the motor body 21, and a motor flange 23 fixed to one end 22a of the motor case 22 positioned on the output side X2. The motor shaft 20 is located at the center of the motor body 21 and extends in the axial direction. The distal end portion of the motor shaft 20 positioned on the output side X2 projects into the speed reducer 10 via the input shaft 11. The electric motor 2 is mounted to the speed reducer 10 via the motor flange 23. The electric motor 2 may be selected from various motors that drive on electricity, such as what is called brushed motors and brushless motors.

The motor case 22 has a tubular shape and houses the motor body 21. The motor case 22 has a case fixing portion 221 positioned on the inner peripheral surface of the end portion of the motor case 22 on the output side X2. The case fixing portion 221 extends over the entire circumference and protrudes inward in the radial direction. The case fixing portion 221 is fixed to an input-side end surface 23b of the motor flange 23 with second fixing bolts 24. The second fixing bolts 24 are inserted through the case fixing portion 221 from the input side X1 and tightened into the input-side end surface 23b of the motor flange 23.

The motor flange 23 has an annular shape. The central portion of the motor flange 23 rotatably supports the motor shaft 20. The motor flange 23 is fixed to the one end 22a of the tubular motor case 22 with the second fixing bolts 24. The cover 5 is fitted on and fixed to the outer peripheral side of the motor flange 23.

The motor flange 23 is integrally formed of a flange plate 25 and a flange tube 26 located on the output side X2 of the flange plate 25. The flange plate 25 allows the motor shaft 20 and the input shaft 11 to be inserted therein. Furthermore, the flange plate 25 has a central opening portion 251 that rotatably supports the input shaft 11 via an annular seal member 252. As shown in FIG. 3, the outer peripheral surface 23a of the motor flange 23 has a first stepped surface 23d facing the output side X2. The outer peripheral surface 23a has a reduced diameter on the output side X2 of the first stepped surface 23d.

As shown in FIG. 2, the flange tube 26 extends from the periphery of the flange plate 25 toward the output side X2. As shown in FIG. 3, the output-side end surface 23c of the flange tube 26, which is located on the output side X2, is at a position where it contacts with the input-side peripheral edge 10b of the speed reducer 10 to support the speed reducer 10. The output-side end surface 23c of the flange tube 26 has internally threaded portions 23f to which first fixing bolts 7 (described later) are screwed. The internally threaded portions 23f are arranged at intervals in the circumferential direction of the flange tube 26.

The distal end portion (the output-side end surface 23c) of the flange tube 26 contacts with the input-side peripheral edge 10b of the speed reducer 10 to support the speed reducer 10. Furthermore, the flange tube 26 has a locking portion 26a positioned on the periphery of the output-side end surface 23c of the flange tube 26. The locking portion 26a protrudes toward the output side X2. The locking portion 26a supports flange portions 14 (described later) of the speed reducer 10 at the outer peripheral side.

In the outer peripheral surface 23a of the motor flange 23, there are provided a pair of first water stop members 27 having an annular shape and configured to stop water between the outer peripheral surface 23a and the inner peripheral surface 5a of the cover 5 on the input side X1. The first water stop members 27 are arranged at an interval in the axial direction. The first water stop members 27 are, for example, O-rings. The first water stop members 27 also serve to stop water between the input-side end surface 23b of the motor flange 23 and the end surface (the one end 22a) of the motor case 22 on the output side X2.

As shown in FIG. 2, the speed reducer 10 includes a reduction unit (not shown) consisting of a multi-stage planetary mechanism, for example, that decelerates the rotational driving force of the electric motor 2 from the input stage side to the output stage side and transmits the decelerated rotational driving force to the rotationally driven portion. The speed reducer 10 will not be described in detail for the present embodiment.

The speed reducer 10 is fixed to an output-side end surface 23c of the motor flange 23 of the electric motor 2 with fixing bolts (not shown).

In this embodiment, the output-side case 13 provided on the output side X2 of the speed reducer 10 is connected to the first arm 120. Thus, the rotational driving force of the electric motor 2 is transmitted to the input shaft 11, the rotational driving force decelerated by the speed reducer 10 is transmitted to the output-side case 13 and then to the first arm 120 that is fixed to the output-side case 13. In the first arm 120, the decelerated rotational driving force can be taken out as an output.

In the outer peripheral surface 13a of the output-side case 13, there is provided a second water stop member 15 having an annular shape and configured to stop water between the outer peripheral surface 13a and the inner peripheral surface 5a of the cover 5 on the output side X2. The second water stop member 15 is, for example, an X-ring.

The speed reducer 10 has flange portions 14 protruding radially outward from the outer peripheral surface 10a of the speed reducer 10 on the input side X1. The flange portions 14 is located between the motor flange 23 and the holding plate 6 (described later) in the axial direction. The flange portions 14 are arranged at intervals in the circumferential direction on the outer peripheral surface 10a of the speed reducer 10. Each of the flange portions 14 has a through hole 14a extending in the axial direction (see FIG. 3). The first fixing bolt (fastening member) 7 (described later) is inserted through the through hole 14a. The flange portion 14 has such a circumferential length that at least one through hole 14a (described later) can extend through the flange portion 14 in the axial direction.

As shown in FIG. 3, the input-side end 14b of each of the flange portions 14, which is located on the input side X1, is fixed so as to be in contact with the output-side end surface 23c of the flange tube 26 of the motor flange 23. The output-side end surface 14c of each of the flange portions 14, which is located on the output side X2, is fixed by the first fixing bolt 7 so as to be in contact with the holding plate 6 (described later).

As shown in FIG. 2, the cover 5 has a cylindrical shape and externally covers and houses the speed reducer 10 and the motor shaft 20 in a liquid-tight manner. The cover 5 is made of, for example, a stainless steel or the like. On the radially inner side of the inner peripheral surface 5a of the cover 5, there are provided the holding plate 6 (holding member) and the first fixing bolts 7 serving as a fixing unit for fixing the cover 5 to the motor flange 23. The cover 5 has a protruding portion 51 (fixing unit) protruding radially inward and extending over at least a part of the circumference of the inner peripheral surface 5a.

As shown in FIG. 3, the protruding portion 51 includes an input-side protruding portion 51A located on the input side X1 and an output-side protruding portion 51B located on the output side X2. The input-side protruding portion 51A is located on the outer peripheral side of the motor flange 23 when the cover 5 is fixed to the motor flange 23. The output-side protruding portion 51B is located on the outer peripheral side of the flange portions 14 of the speed reducer 10 when the cover 5 is fixed to the motor flange 23. The output-side protruding portion 51B is located between the motor flange 23 and the holding plate 6 in the axial direction. The input-side protruding portion 51A has a first stepped surface 51a which faces the input side X1. The first stepped surface 51a is in contact with the first stepped surface 23d formed on the outer peripheral surface 23a of the motor flange 23.

The holding plate 6 clamps the protruding portion 51 together with the motor flange 23 in the axial direction of the electric motor 2. The holding plate 6 is an annular plate extending over the entire circumference, and the front and back surfaces thereof face in the axial direction. The holding plate 6 is fixed in the axial direction toward the motor flange 23 by tightening the first fixing bolts 7 from the output side X2. The holding plate 6 has bolt holes (not shown) arranged at predetermined intervals along the circumferential direction. The bolt holes are located at the positions corresponding to the through holes 14a in the flange portions 14.

The first fixing bolts 7 are inserted through the through holes 14a in the flange portions 14 interposed between the holding plate 6 and the motor flange 23, and are tightened and fixed to the internally threaded portions 23f formed in the output-side end surface 23c of the motor flange 23. In other words, the first fixing bolts 7 fix the cover 5 to the motor flange 23 in the axial direction.

The first water stop members 27 stop water between the inner peripheral surface 5a of the input-side end portion 5b of the cover 5 and the outer peripheral surface 23a of the motor flange 23. The second water stop member 15 stops water between the inner peripheral surface 5a of the output-side end portion Sc of the cover 5 and the outer peripheral surface 13a of the output-side case 13.

Next, the process of assembling the waterproof structure 1 is described based on FIGS. 2 and 3. The first step is as follows. After the speed reducer 10 is fixed to the motor flange 23 of the electric motor 2, and the output-side case 13 is detached from the speed reducer 10, the cover 5 is fitted onto the outer peripheral side of the speed reducer 10 and the motor flange 23 from the output side X2. At this time, the first stepped surface 51a of the input-side protruding portion 51A contacts with the first stepped surface 23d formed on the outer peripheral surface 23a of the motor flange 23. Thus, the cover 5 is prevented from moving to the input side X1 along the axial direction. In other words, the cover 5 is fixed in the position in which the first stepped surface 51a and the first stepped surface 23d are in contact with each other.

Next, the holding plate 6 is advanced from the output side X2 into the gap S between the outer peripheral surface 10a of the speed reducer 10 and the inner peripheral surface 5a of the cover 5, and the holding plate 6 is placed so that it contacts with the output-side end surfaces 14c of the flange portions 14. Subsequently, the first fixing bolts 7 are advanced into the gap S from the output side X2, inserted through the through holes (not shown) in the holding plate 6 and the through holes 14a in the flange portions 14, and tightened to the internally threaded portions 23f of the motor flange 23 for fastening. By tightening the first fixing bolts 7, the holding plate 6 is fixed to the motor flange 23 together with the flange portions 14 (the speed reducer 10). Thus, the protruding portion 51 of the cover 5 is clamped and fixed in the axial direction between the holding plate 6 and the motor flange 23. In other words, the cover 5 is prevented from moving in the axial direction. The output-side case 13 with the second water stop member 15 is then fixed to the output side X2 of the speed reducer 10. Thus, the assembling of the waterproof structure 1 is completed.

As described above, the waterproof structure 1 for the speed reducer 10 according to the embodiment includes: the speed reducer 10 configured to decelerate the rotational driving force from the electric motor 2 and transmits the decelerated rotational driving force to a rotationally driven portion; the motor flange 23 that houses the motor shaft 20 of the electric motor 2 and the speed reducer 10; and a cover 5 that externally covers the speed reducer 10 in a liquid-tight manner. The fixing unit (the holding plate 6, the protruding portion 51, and the first fixing bolts 7) for fixing the cover 5 to the motor flange 23 is provided on the inner peripheral side of the cover 5. Therefore, in the waterproof structure 1 for the speed reducer 10 according to the embodiment, the cover 5 can be fixed by the fixing unit on the inner peripheral side of the cover 5 to the motor flange 23 that houses the speed reducer 10. Therefore, there is no need to provide a fixing structure on the outer peripheral side of the cover 5, and no fixing unit such as fixing bolts extends through the cover 5 for fixing to the motor flange 23. Therefore, there is no need to provide through holes extending through the cover 5. Accordingly, water does not enter through the through holes to the speed reducer 10 side, thus the waterproof structure 1 has an improved waterproof performance. This configuration allows the cover 5 to be integrated with the speed reducer 10 inside without being penetrated by bolts or the like, thereby establishing waterproof quality through internal fixing.

In the waterproof structure 1 for the speed reducer 10 according to the embodiment, the fixing unit is provided on at least one of the cover 5 or the motor flange 23. This allows for a simple configuration of the fixing unit. In addition, the waterproof structure 1 can be easily assembled by, for example, providing the fixing unit beforehand on at least one of the cover 5 or the motor flange 23.

Furthermore, in the waterproof structure 1 for the speed reducer 10 according to the embodiment, the fixing unit fixes the cover 5 to the motor flange 23 in the axial direction. Thus, the cover 5 can be fixed to the motor flange 23 so as to be prevented from moving in the axial direction.

In the waterproof structure 1 for the speed reducer according to the embodiment, the fixing unit includes: a protruding portion 51 protruding radially inward from the inner peripheral surface 5a of the cover 5; and a holding plate 6 that clamps the protruding portion 51 together with the motor flange 23 in the axial direction of the electric motor 2. Thus, with the holding plate 6, the cover 5 can be fixed to the motor flange 23 so as to be prevented from moving in the axial direction.

Furthermore, in the waterproof structure 1 for the speed reducer according to the embodiment, the fixing unit includes the first fixing bolts 7 inserted through the holding plate 6 and tightened into the motor flange 23. The first fixing bolts 7 are tightened in the axial direction, such that the holding plate 6 clamps the protruding portion 51 of the cover 5 together with the motor flange 23. Therefore, the holding plate 6 can be fixed by tightening the first fixing bolts 7. The fixed holding plate 6 can clamp the protruding portion 51 together with the motor flange 23, and thus the cover 5 can be fixed to the motor flange 23 so as to prevent the protruding portion 51 from moving in the axial direction. Therefore, in this embodiment, the cover 5 can be easily fixed to the motor flange 23 only by tightening the first fixing bolts 7, improving the work efficiency in assembling the waterproof structure 1.

In the waterproof structure 1 for the speed reducer according to the embodiment, the speed reducer 10 includes the flange portions 14 located between the motor flange 23 and the holding plate 6 in the axial direction and protruding radially outward from the outer peripheral surface 10a of the speed reducer 10. Each of the flange portions 14 has a through hole 14a extending in the axial direction. The first fixing bolts 7 are inserted through the through holes 14a in the flange portions 14 interposed between the holding plate 6 and the motor flange 23, and are tightened into the motor flange 23. With this configuration, the first fixing bolts 7 are inserted through the through holes 14a in the flange portions 14 of the speed reducer 10 and are tightened into the motor flange 23, making it possible to fix the cover 5, the speed reducer 10, and the motor flange 23 simultaneously. Therefore, the time and labor required for assembling the waterproof structure 1 can be reduced, resulting in an improved work efficiency.

In the waterproof structure 1 for the speed reducer according to the embodiment, the holding plate 6 is an annular plate that extends over the entire circumference around the motor shaft of the electric motor 2. This configuration makes it possible that one holding plate 6 holds the cover 5 against the motor flange 23 with a balanced and uniform force over the entire circumference. Therefore, it is possible to prevent the cover 5 from being displaced in the axial direction and prevent the water-stopping performance from being degraded.

The waterproof structure 1 for the speed reducer according to the embodiment includes the water stop members 27, 15 provided on both sides of the cover 5 in the axial direction and configured to stop water between the cover 5 and the outer peripheral surface 23a of the motor flange 23 and between the cover 5 and the outer peripheral surface 13a of the output-side case 13. This configuration ensures the water-stopping performance between the cover 5 and the motor flange 23 and between the cover 5 and the output-side case 13 at positions on the cover 5 on both sides of the fixing unit in the axial direction.

In addition, the rotation device according to the embodiment includes: the pedestal 110; the second arm 130 having the working head 140; the electric motor 2 provided in the pedestal 110 and configured to provide a driving force to rotate the first arm 120, the speed reducer 10 configured to decelerate the rotational driving force of the electric motor 2 and transmit the decelerated rotational driving force to the rotationally driven portion; the motor flange 23 that houses the speed reducer 10; and the cover 5 that externally covers the speed reducer 10 in a liquid-tight manner. The fixing unit for fixing the cover 5 to the motor flange 23 is provided on the inner peripheral side of the cover 5. Therefore, the waterproof structure 1 for the speed reducer 10 can be installed on the rotation device having the first arm 120 as the rotating body configured to be rotated by the rotational driving force transmitted from the electric motor 2 and the speed reducer 10.

The present invention is not limited to the above-described embodiments, and the embodiments can be modified in a variety of designs without deviating from the spirit of the present invention. For example, in the above embodiment, the fixing unit including the holding plate 6 (holding member) and the first fixing bolts 7 are provided on the motor flange 23 (case) via the flange portions 14 of the speed reducer 10 on the radially inner side of the cover 5, but this configuration is not limitative. For example, the fixing unit may be provided on the cover 5. Thus, the fixing unit is provided on at least one of the cover 5 or the case.

The holding member is not necessarily annular in the circumferential direction and plate-shaped like the holding plate 6 in the embodiment. For example, the holding member is not necessarily integrated over the entire circumference, but may be constituted by a plurality of parts arranged in the circumferential direction. The holding member may be integrally fixed to the outer peripheral surface 10a of the speed reducer 10. In other words, the holding member may be integrally provided on the output-side end surfaces 14c on the output side X2 of the flange portions 14 of the speed reducer 10 according to the embodiment, or the flange portions 14 may be configured to serve as a holding member.

Furthermore, it is also possible that the holding member is integrally fixed to the outer peripheral surface of the case. For example, the holding member may be fixed to the output-side end surface 23c of the motor flange 23.

A modification of the fixing unit may include: for example, a protruding portion protruding radially inward from the inner peripheral surface 5a of the cover 5 and having through holes that extend through the protruding portion in the axial direction of the electric motor 2; and fastening members constituted by fixing bolts inserted through the through holes and tightened into the case. Thus, the protruding portion and the fastening members constituting the fixing unit are provided on the cover 5 side. In this case, the protruding portion of the cover 5 can be fixed directly to the case.

In the embodiment, the first fixing bolts 7 are used as the fastening members, but the fastening members are not limited to bolts, but may be screws or any other fixing members.

In the embodiment described above, the rotation device to which the waterproof structure 1 for the speed reducer 10 is applied is the industrial robot 100, but the rotation device according the invention is not limited to the industrial robot 100.

The foregoing embodiments disclosed herein describe a plurality of physically separate constituent parts. They may be combined into a single part, and any one of them may be divided into a plurality of physically separate constituent parts. Irrespective of whether or not the components are integrated, they are acceptable as long as they are configured to attain the object of the invention.

What is claimed is:

1. A waterproof structure for a speed reducer, comprising:
   a speed reducer for decelerating a rotational driving force of an electric motor and transmitting the decelerated rotational driving force to a rotationally driven portion;
   a case housing the speed reducer;
   a cover externally covering the speed reducer in a liquid-tight manner; and
   a fixing unit provided on an inner peripheral side of the cover to fix the cover to the case,
   wherein the fixing unit includes:
      a protruding portion protruding radially inward from an inner peripheral surface of the cover; and
      a holding member clamping the protruding portion together with the case in an axial direction of the electric motor.

2. The waterproof structure for a speed reducer according to claim 1, wherein the fixing unit is provided on at least one of the cover or the case.

3. The waterproof structure for a speed reducer according to claim 1, wherein the fixing unit fixes the cover to the case in an axial direction of the electric motor.

4. The waterproof structure for a speed reducer according to claim 1, wherein the fixing unit includes a fastening member inserted through the holding member and tightened into the case, and
   wherein the holding member is configured to clamp the protruding portion together with the case as the fastening member is tightened in the axial direction.

5. The waterproof structure for a speed reducer according to claim 4, wherein the speed reducer has a flange portion protruding radially outward from an outer peripheral surface of the speed reducer,
   wherein the flange portion is located between the case and the holding member in the axial direction,
   wherein the flange portion has a through hole extending in the axial direction, and
   wherein the fastening member is inserted through the through hole of the flange portion interposed between the holding member and the case and is tightened into the case.

6. The waterproof structure for a speed reducer according to claim 1, wherein the holding member is integrally fixed to an outer peripheral surface of the case.

7. The waterproof structure for a speed reducer according to claim 1, wherein the holding member is integrally fixed to an outer peripheral surface of the speed reducer.

8. The waterproof structure for a speed reducer according to claim 1, wherein the holding member is an annular plate extending over an entire circumference around a motor shaft of the electric motor.

9. The waterproof structure for a speed reducer according to claim 1, wherein the fixing unit includes:
   the protruding portion having a through hole extending through the protruding portion in an axial direction of the electric motor; and
   a fastening member inserted through the through hole and tightened into the case.

10. The waterproof structure for a speed reducer according to claim 1, wherein water stop members are provided on both sides of the cover in an axial direction, and the water stop members are configured to stop water between the cover and an outer peripheral surface of the case.

11. A waterproof structure for a speed reducer, comprising:
   a speed reducer for decelerating a rotational driving force of an electric motor and transmitting the decelerated rotational driving force to a rotationally driven portion;
   a case housing the speed reducer;
   a cover externally covering the speed reducer in a liquid-tight manner; and
   a fixing unit provided on an inner peripheral side of the cover to fix the cover to the case,
   wherein the fixing unit includes:
      a protruding portion protruding radially inward from an inner peripheral surface of the cover;
      a holding member clamping the protruding portion together with the case in an axial direction of the electric motor; and
      a fastening member inserted through the holding member and tightened into the case,
   wherein the holding member is an annular plate extending over an entire circumference around a motor shaft of the electric motor, and the holding member is configured to clamp the protruding portion of the cover together with the case as the fastening member is tightened in the axial direction, and
   wherein water stop members are provided on both sides of the cover in the axial direction, and the water stop members are configured to stop water between the cover and an outer peripheral surface of the case.

12. A rotation device, comprising:
   a device body;
   a rotating body having a working head;
   an electric motor provided in the device body, the electric motor being configured to produce a driving force to rotate the rotating body;
   a speed reducer for decelerating a rotational driving force of the electric motor and transmitting the decelerated rotational driving force to a rotationally driven portion;
   a case housing the speed reducer;
   a cover externally covering the speed reducer in a liquid-tight manner; and
   a fixing unit provided on an inner peripheral side of the cover to fix the cover to the case,
   wherein the fixing unit includes:
      a protruding portion protruding radially inward from an inner peripheral surface of the cover; and a holding member clamping the protruding portion together with the case in an axial direction of the electric motor.

\* \* \* \* \*